July 22, 1952  A. G. STEINMAYER  2,604,178
CLAMPING DEVICE FOR GUY WIRE GUARDS
Filed July 9, 1948

INVENTOR.
ALWIN G. STEINMAYER.
BY
Chester W. Brown
ATTORNEY.

Patented July 22, 1952

2,604,178

UNITED STATES PATENT OFFICE 2,604,178

CLAMPING DEVICE FOR GUY WIRE GUARDS

Alwin G. Steinmayer, Milwaukee, Wis., assignor to McGraw Electric Company, a corporation of Delaware Application July 9, 1948, Serial No. 37,815

2 Claims. (Cl. 189—31.5)

This invention relates to improvements in a clamping device for guy wire guards and the like.

An object of this invention is to provide a guard or shield with fastening means that is relatively simple in construction, is inexpensive to manufacture and is easy to assemble, to install on guy guards, and to mount on guy rods or cables.

Other novel features and advantages of the invention disclosed in the drawings will become apparent from the description which follows.

In the drawings.

Like numerals are used to designate like parts in the various views.

Figure 1:
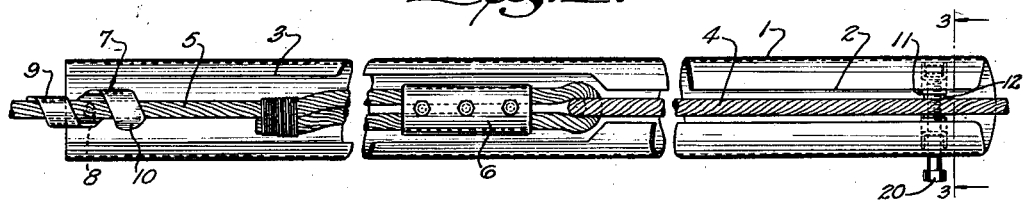
Fig. 1 is a fragmentary view of a guy guard assembly including the novel clamping device herein disclosed.
Figure 2:
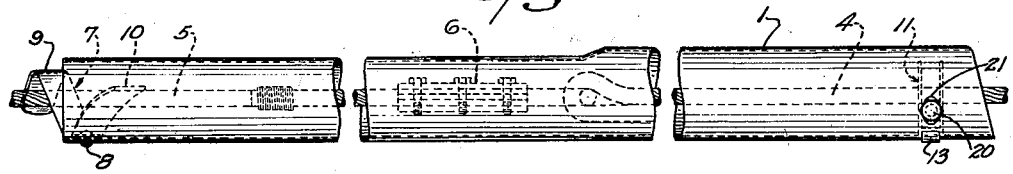
Fig. 2 is a side view as seen from the bottom relative to Fig. 1.
Figures 3, 4:
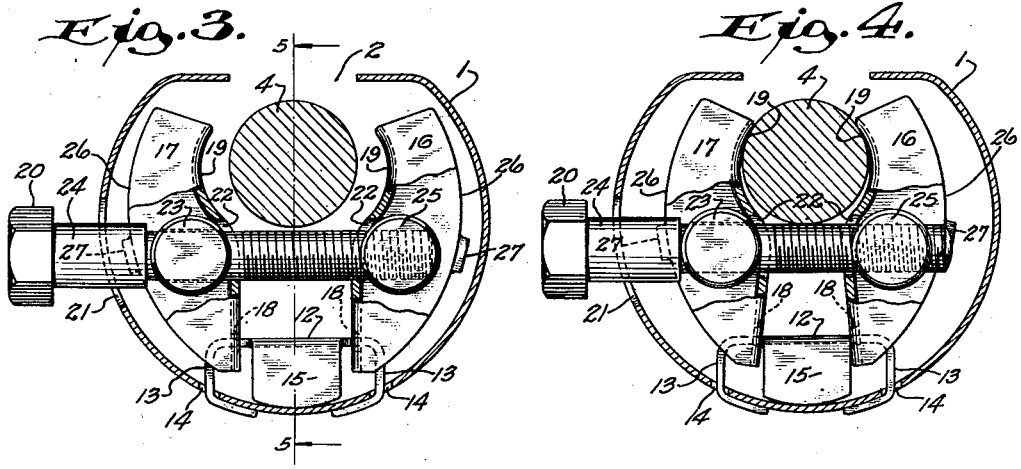
Fig. 3 is an enlarged view in transverse section taken on the line 3—3 of Fig. 1 showing the clamping device with the jaws spread apart.
Fig. 4 is an enlarged view in transverse section taken on the line 3—3 of Fig. 1 showing a guy rod clamped in place.
Figure 5:
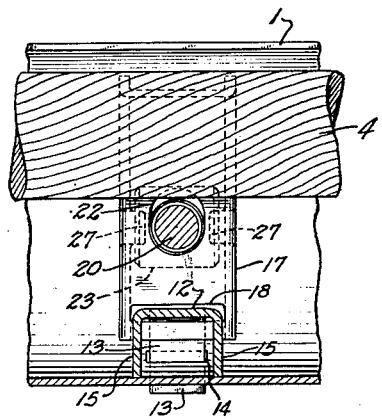
Fig. 5 is an enlarged side view partly in section showing the clamping device mounted in the guard.

The guard comprises an elongated channel-shaped body member 1 which is slotted at 2 on one side longitudinally of the member to admit a guy rod 4 and cable 5 radially of the body member 1, the slot 2 being widened at one end 3 to admit cable and rod attaching means 6. A clip 7 is positioned at one end of the guard diametrically opposite the widened end 3 of the slot 2 and is suitably fastened to the inner periphery of the body member 1 by means such as a rivet 8. The clip 7 is made of a relatively narrow piece of material defining a substantially spiral form terminating in a U-shaped hook portion 9 projecting a short distance towards the side of member 1 to which the clip 7 is attached. The end 10 on the clip 7 projects in a direction generally normal to the hook portion 9 and substantially tangential to the spiral portion of the clip. As indicated, the clip embraces the cable 5.

At the end of the body member 1 opposite that to which the clip 7 is attached, a clamp 11 is provided and includes a support 12 having relatively spaced tongue portions 13 projecting through corresponding slots 14 in the member 1 and clinched to the exterior of the member 1 to hold the support fixedly in place with spacer or aligning portions 15 in contact with the inner periphery of the member 1.

At one end each of the clamping jaws 16 and 17 is provided with an aperture 18 through which one of the tongue portions 13 of support 12 extends to thereby provide a pivot mounting on support 12 for the clamping jaw. The support 12 being positioned diametrically opposite the slot 2 in member 1 so that the other end of each clamping jaw 16 and 17, each of which is provided with a solid arcuate clamping surface 19, face the slot 2 to embrace the guy rod 4. A bolt 20 projects through a hole 21 in the member 1 and through apertures 22 situated between the arcuate clamping surfaces 19 and pivot aperture 18 of the clamping jaws 16 and 17. A cylindrical spacer 23 is loosely positioned on the bolt 20 between the jaw 17 and the enlarged shank portion 24 on the bolt 20. The threaded end of the bolt 20 engages the cylindrical nut 25 which serves as an actuator for the jaw 16. The spacer 23 and nut 25 are cylindrically shaped with their axis relative to the axis of member 1, so as to provide constant contact between each clamping jaw 16 and 17 and the spacer 23 and nut 25 regardless of the angular position of bolt 20 in apertures 22. The apertures 22 in clamping jaws 16 and 17 being oval shaped with the transverse axis lying between aperture 18 and arcuate clamping surface 19 provide the clamping jaws 16 and 17 free movement without binding on the bolt 20 when the jaws are pivoted on support 12. The conjugate axis of the aperture 22 being of a size to hold the nut 25 and spacer 23 within the jaw channels 26.

As indicated, the clamping jaws 16 and 17 are channel shaped and the sides 26 serve as means for holding the spacer 23 and nut 25 against rotation about the axis of the bolt 20, the ends of the spacer 23 and nut 25 being flat in complement to the sides 26 of the jaws. Keepers 27 which project inwardly from the sides 26 of clamping jaws 16 and 17 hold the spacer 23 and nut 25 within the respective jaw channels when the jaws are moved from each other as more specifically described hereafter.

When the bolt 20 is revolved in one direction nut 25 being threaded and restrained from turning exerts pressure on clamping jaw 16 drawing it toward clamping jaw 17, which in turn is drawn toward clamping jaw 16 by the shank portion 24 of bolt 20 exerting pressure on spacer 23 on bolt 20. Both clamping jaws 16 and 17 being pivoted on support 12 are thus caused to embrace the guy rod 4 between the clamping surfaces 19.

When the bolt 20 is revolved in direction opposite that previously noted, the bolt acting through nut 25, which then contacts keepers 27 moves the clamping jaw 16 away from clamping jaw 17, which in turn is allowed to travel on bolt 20 as the shank portion 24 on bolt 20 is withdrawn from contact with spacer 23 and so releases guy rod 4 from the arcuate clamping surfaces 19.

As seen from the above description the clamping jaws 16 and 17 are so pivoted and actuated that they move laterally relative to each other in a plane disposed diametrically of the member 1 and passing through the axis of the bolt hole 21 therein.

I have disclosed a preferred embodiment of the invention but this is not to be construed as a limitation thereof.

I claim:

1. In a device of the character described, the combination with a support, of a pair of clamping jaws pivotally mounted at corresponding adjacent ends on said support, said jaws each comprising a channel member having a clamping surface opposite said channel, a jaw actuating bolt extending loosely through corresponding apertures in said jaws situated between said pivot mounting and said clamping surface, and jaw engaging members mounted on said bolt and each having an arcuate surface in contact with the bottom of one of said channels and having substantially parallel ends engaging the sides of said channel, said bolt engaging said members in one direction of revolution thereof to move said members into clamp actuating opposition.

2. In a guy wire guard including a channel-shaped member open on one side longitudinally thereof to receive a guy wire, the combination with a pair of pivotally mounted clamping jaws, the corresponding pivot ends of said jaws each having a slot, of a pivot support having opposed tongues each projecting through one of said slots and securing said support to the inner wall of said member on the side thereof opposite the open side of said member, said support including a spacer portion between said tongue and jaws engaging the inner wall of said member, said jaws movable laterally relative to each other and to said open side, and a jaw actuating bolt engaging said jaws intermediate the ends thereof, said bolt extending loosely through a side of said member and in a direction substantially normal to a plane including said open side and pivot support.

ALWIN G. STEINMAYER.

REFERENCES CITED

The following references are of record in the file of this patent:

UNITED STATES PATENTS

| Number | Name | Date |
|---|---|---|
| 623,606 | Homan | Apr. 25, 1899 |
| 1,181,687 | Seiss | May 2, 1916 |
| 1,971,477 | Blackburn | Aug. 28, 1934 |
| 2,061,306 | Hocher et al. | Nov. 17, 1936 |
| 2,061,307 | Hocher et al. | Nov. 17, 1936 |
| 2,264,430 | Bierce | Dec. 2, 1941 |
| 2,511,012 | Runde et al. | June 13, 1950 |

FOREIGN PATENTS

| Number | Country | Date |
|---|---|---|
| 18,882 | Great Britain | Aug. 28, 1902 |